Figure 2:
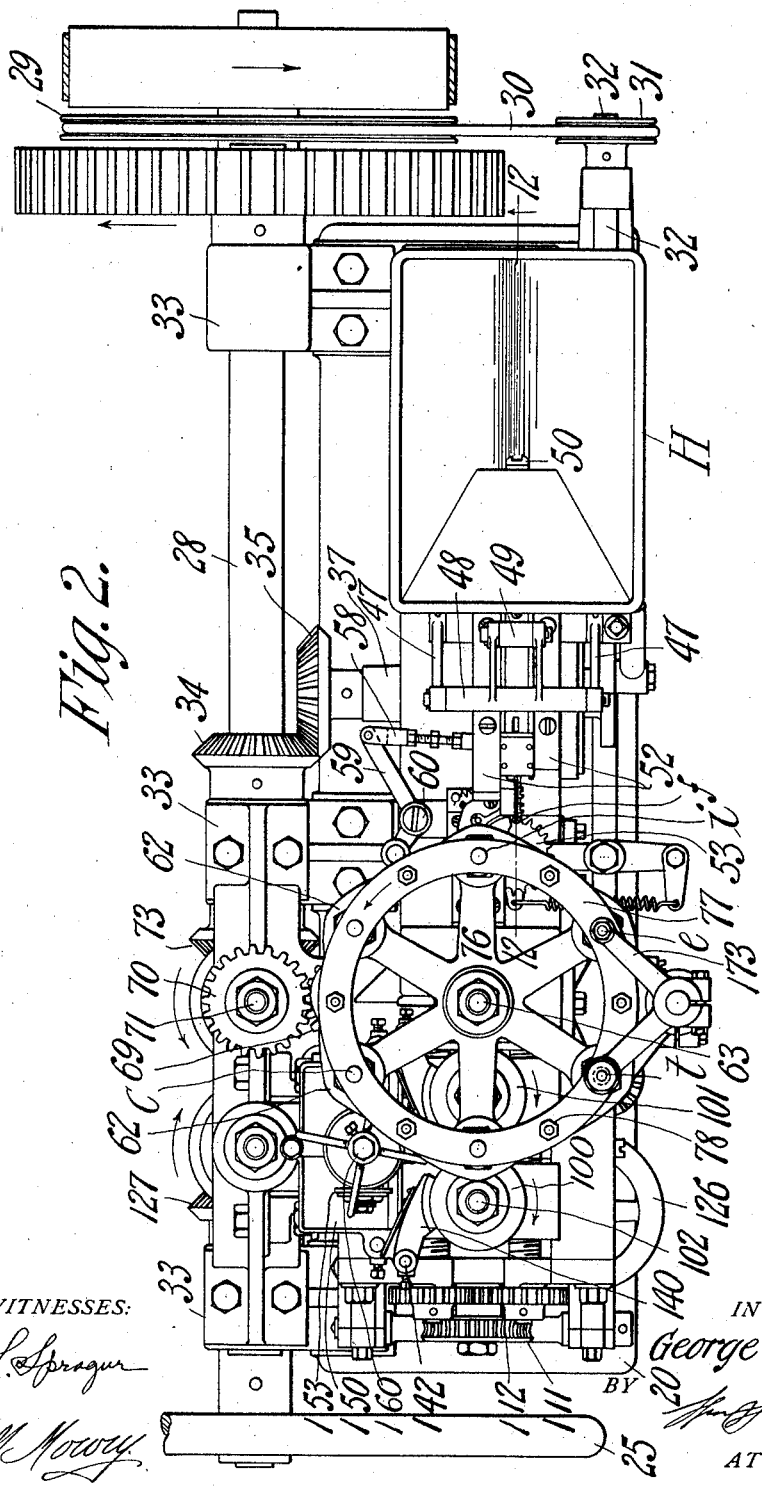

G. T. WARWICK.
SCREW MACHINE.
APPLICATION FILED DEC. 29, 1909.
1,044,429.
Patented Nov. 12, 1912.
7 SHEETS—SHEET 1.
Fig. 1.
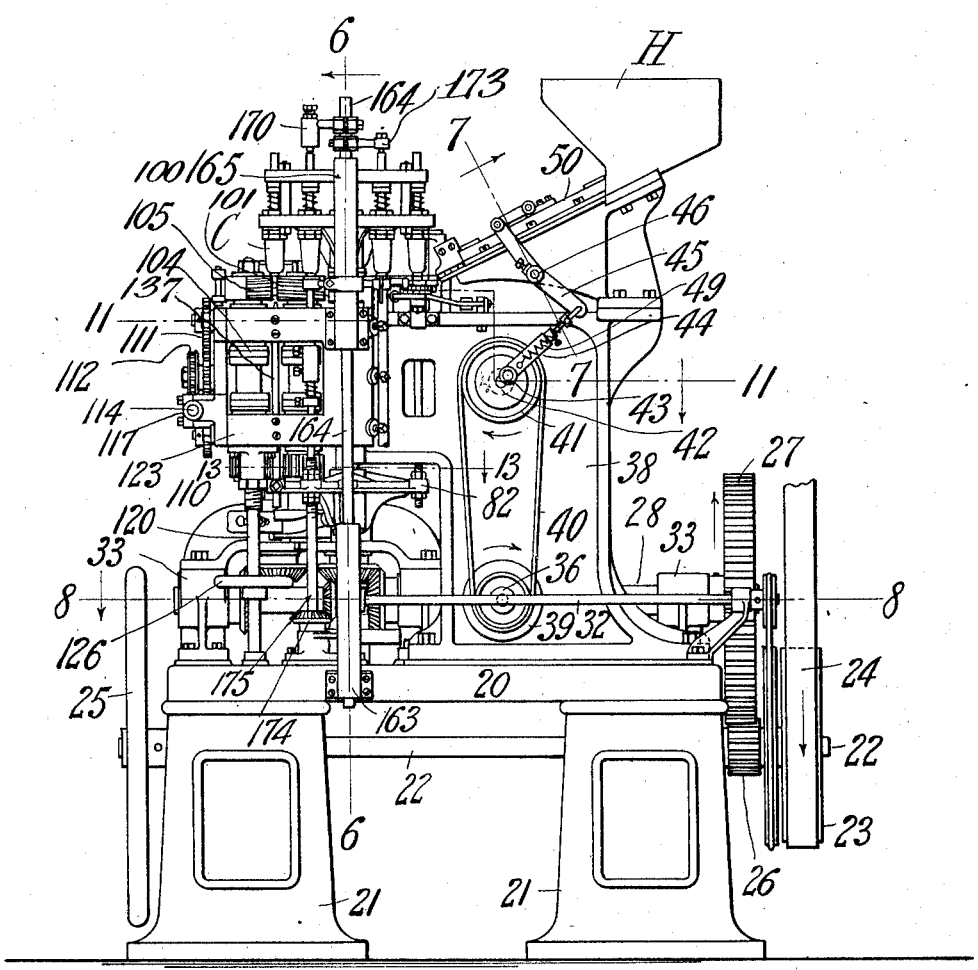
WITNESSES:
INVENTOR,
George T. Warwick,
BY
ATTORNEY.

G. T. WARWICK.
SCREW MACHINE.
APPLICATION FILED DEC. 29, 1909.

1,044,429.

Patented Nov. 12, 1912.
7 SHEETS—SHEET 2.

WITNESSES:
H. L. Sprague
R. M. Nowry

INVENTOR.
George T. Warwick,
BY
ATTORNEY.

G. T. WARWICK.
SCREW MACHINE.
APPLICATION FILED DEC. 29, 1909.
1,044,429.
Patented Nov. 12, 1912.
7 SHEETS—SHEET 3.
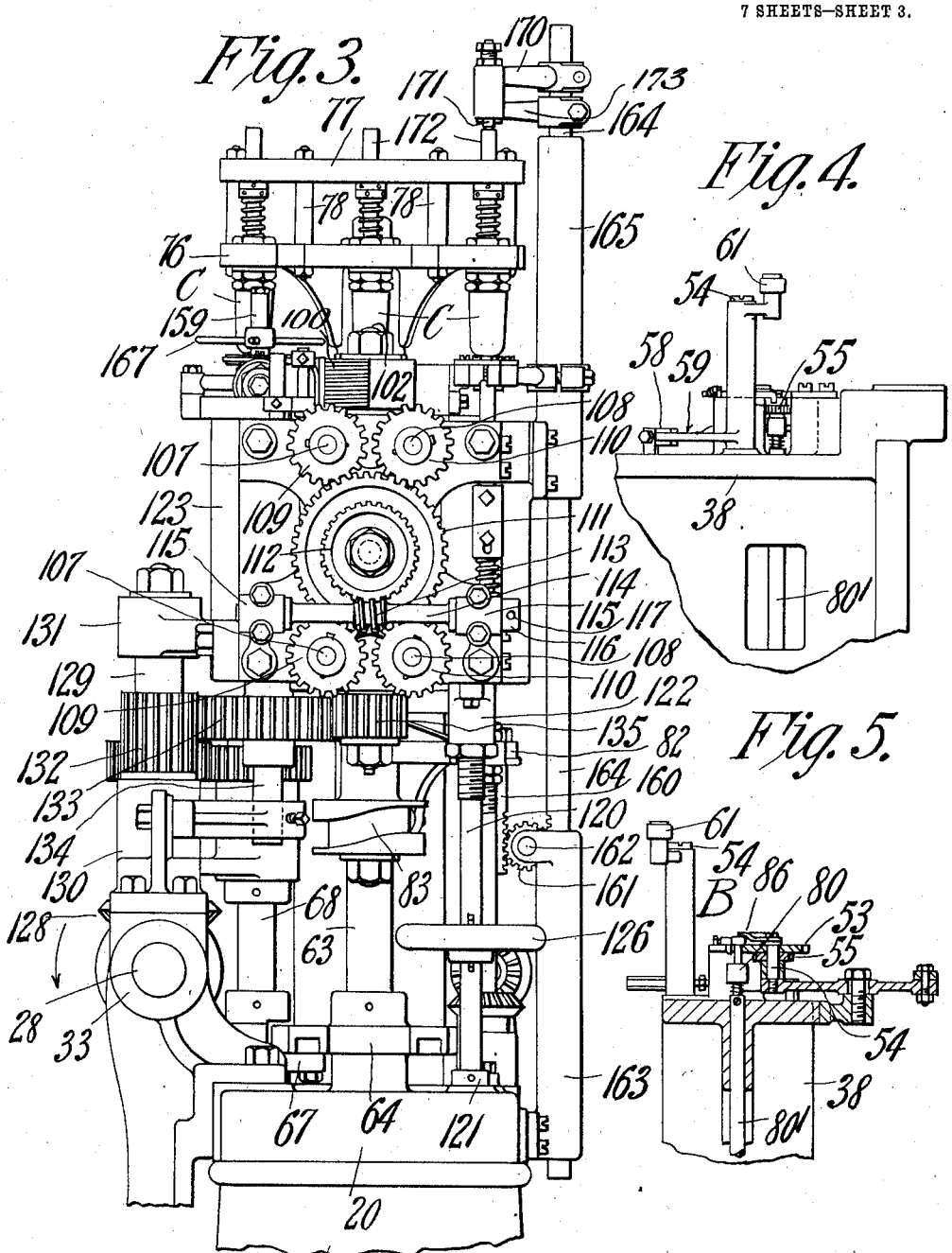
Fig. 3. Fig. 4. Fig. 5.
WITNESSES:
H. L. Sprague
R. M. Mowry
INVENTOR,
George T. Warwick,
BY 
ATTORNEY.

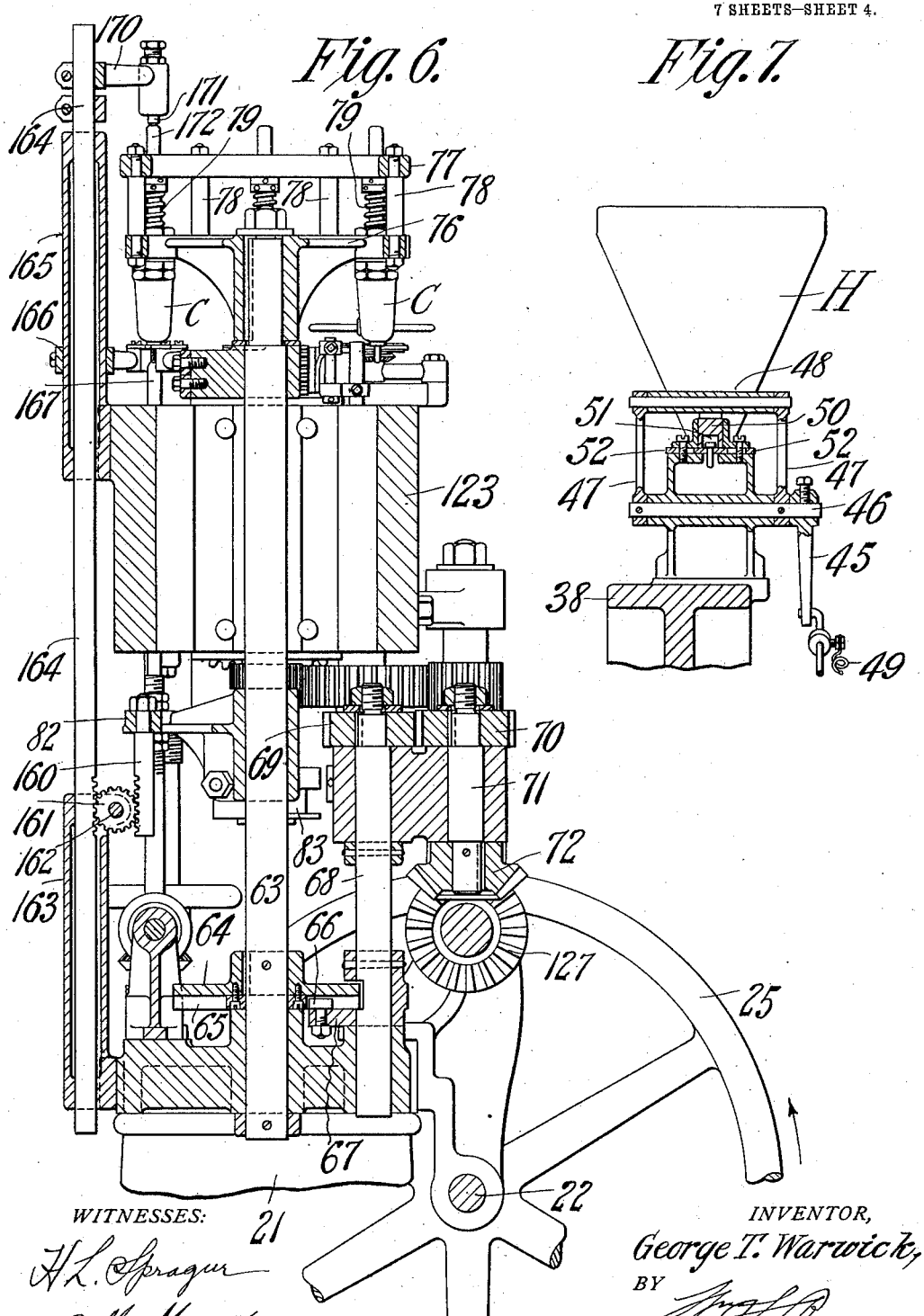

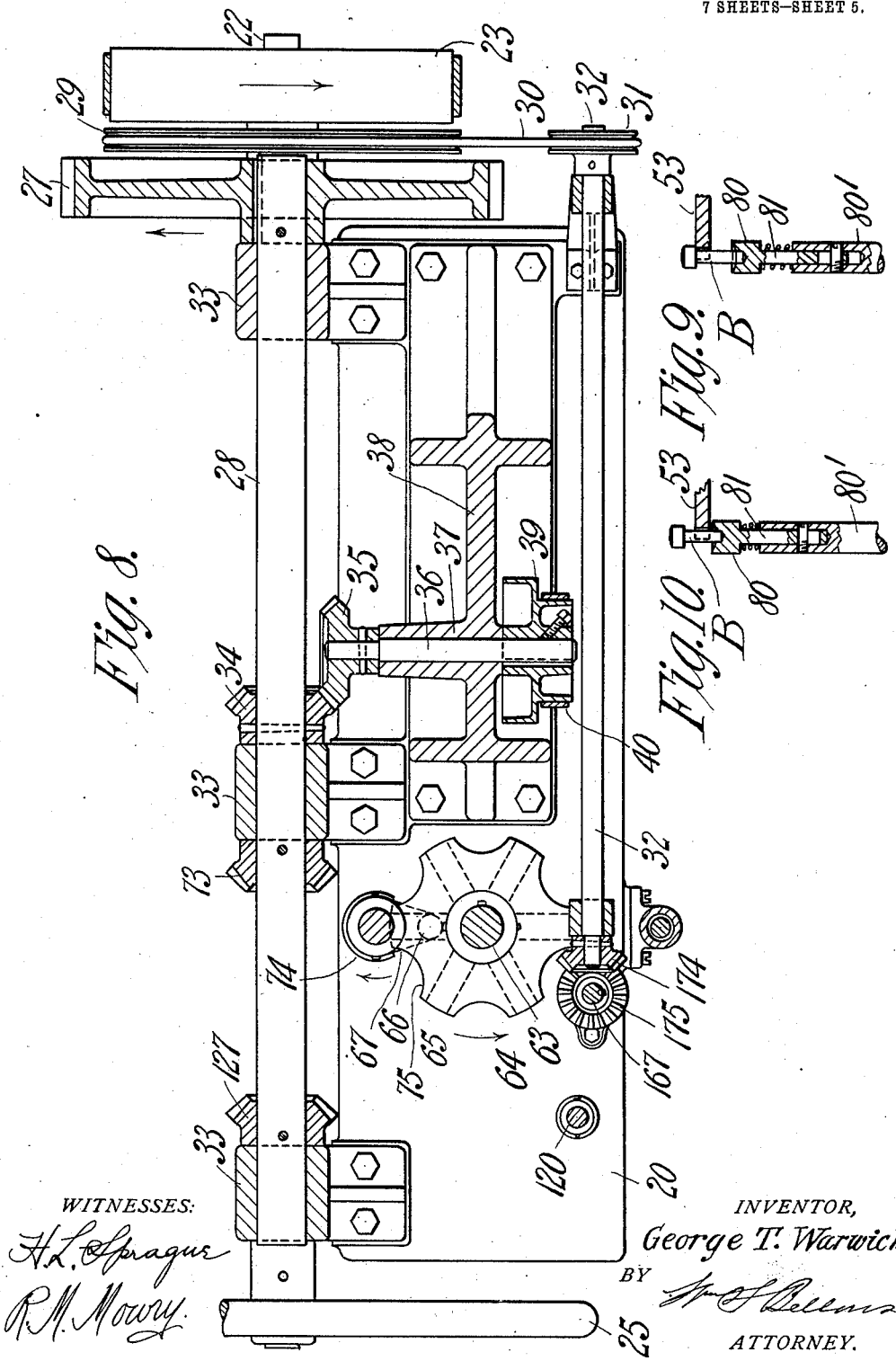

G. T. WARWICK.
SCREW MACHINE.
APPLICATION FILED DEC. 29, 1909.

1,044,429.

Patented Nov. 12, 1912.

7 SHEETS—SHEET 6.

WITNESSES:
H. L. Sprague
R. M. Mowry

INVENTOR,
George T. Warwick,
BY
ATTORNEY.

COLUMBIA PLANOGRAPH CO., WASHINGTON, D. C.

G. T. WARWICK.
SCREW MACHINE.
APPLICATION FILED DEC. 29, 1909.
1,044,429.
Patented Nov. 12, 1912.
7 SHEETS—SHEET 7.
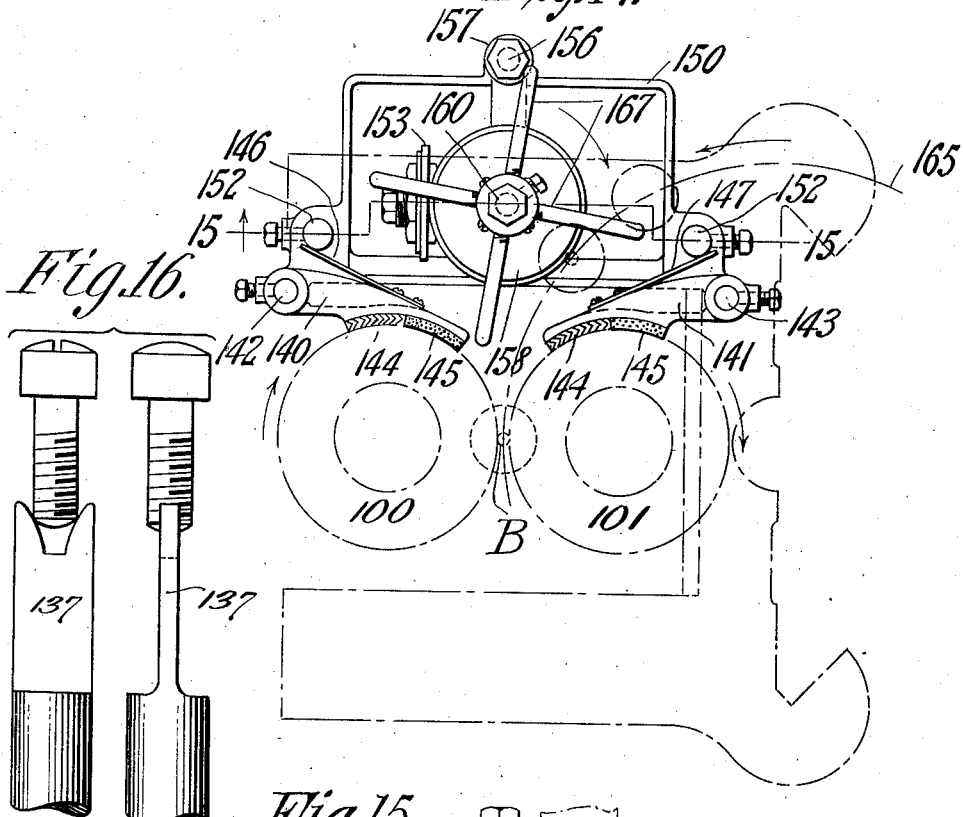
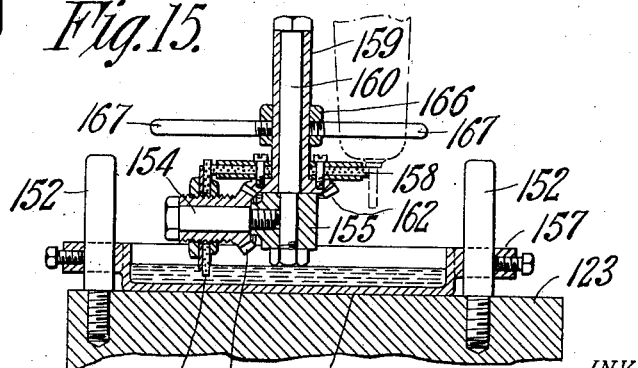
WITNESSES:
INVENTOR,
George T. Warwick,
BY
ATTORNEY.

UNITED STATES PATENT OFFICE.

GEORGE THOMAS WARWICK, OF SPRINGFIELD, MASSACHUSETTS.

SCREW-MACHINE.

1,044,429.  Specification of Letters Patent. Patented Nov. 12, 1912.

Application filed December 29, 1909. Serial No. 535,523.

*To all whom it may concern:*

Be it known that I, GEORGE T. WARWICK, a citizen of the United States of America, and resident of Springfield, in the county of Hampden and State of Massachusetts, have invented certain new and useful Improvements in Screw-Machines, of which the following is a full, clear, and exact description.

This invention relates to screw machines, and more especially to that class thereof in which the screw threads are rolled onto blanks which have been previously headed, and a quantity of which is contained within a hopper from which said blanks may be fed to be individually acted upon by the threading tools.

The invention has for one of its objects the provision of an improved machine of this character which comprises a series of chucks adapted to receive blanks and whereby the same are brought into conjunction with the threading as well as other trimming tools in such a manner that several blanks may be in process at the same time.

Further objects of the invention will hereinafter appear and the means of their attainment be particularly pointed out in the claims.

Briefly stated, my improved machine comprises a head which is rotatably mounted and which carries a series of chucks each having jaws between which the screw blanks may be forced by a specially designed mechanism, and whereby these blanks are then successively carried between a pair of co-operative dies whereby the thread is rolled onto the blanks at any desired position relative to the head of the blank, means being provided whereby a variation of the dies relative to the chucks may be obtained so as to adapt the machine for screws of various sizes and lengths. After the thread has been rolled onto the blanks, the latter are transferred to what may be termed a trimming tool whereby the bur resulting from the thread rolling operation at the end of the blank, may be removed and the screw will thus be in finished condition.

The invention has been clearly illustrated in the accompanying drawings in which—

Figure 11:
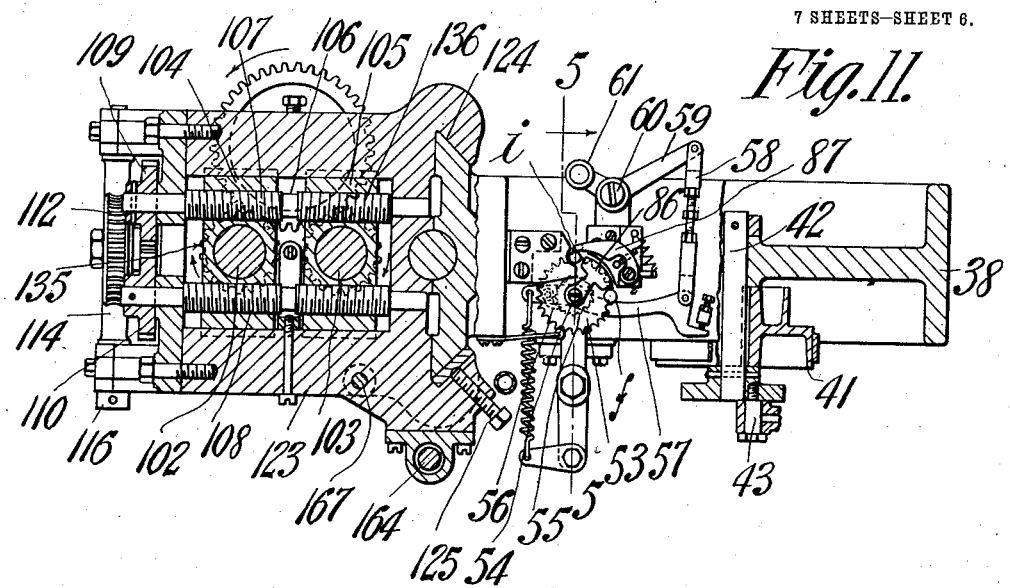
Figure 12:
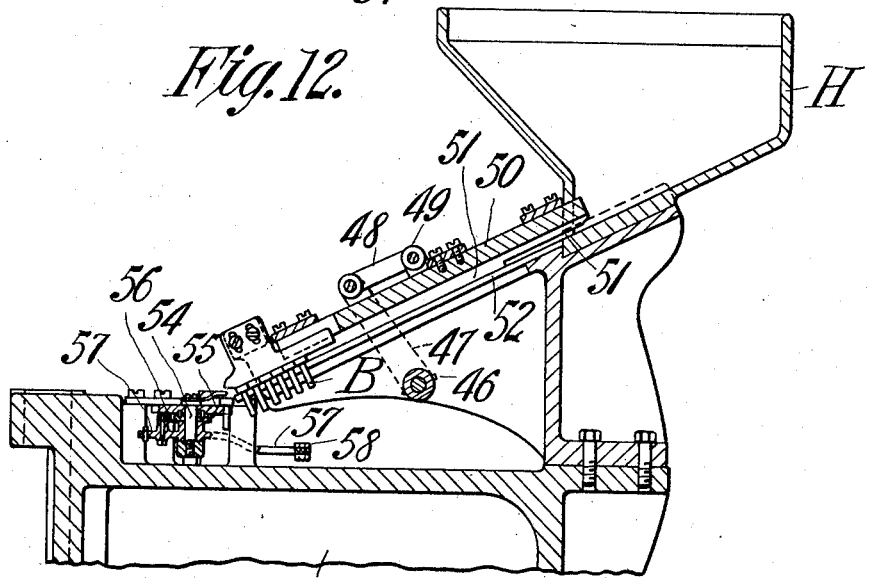
Figure 13:
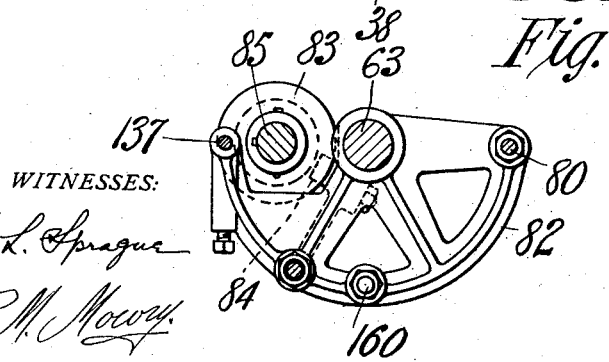

Figure 1 represents a side view of a screw machine embodying my invention. Fig. 2 is a top view thereof on an enlarged scale as compared with that of Fig. 1. Fig. 3 is a fractional end view of the machine. Figs. 4 and 5 are detail views illustrating parts of the mechanism in detail as will be hereinafter described. Fig. 6 is a vertical section on line 6, 6 of Fig. 1. Fig. 7 is a section on line 7, 7 of Fig. 1. Fig. 8 is a horizontal section on line 8, 8 of Fig. 1. Figs. 9 and 10 illustrate the operation of the loading-in mechanism whereby the blanks are forced into the chucks. Fig. 11 is a horizontal section on line 11 of Fig. 1. Fig. 12 is a central section through the hopper and the feed trough, together with the receiving and transfer mechanisms. Fig. 13 represents a top view of the head-raising mechanism to be hereinafter described, and Figs. 14 and 15 represent top views and vertical sections of the mechanism whereby oil is applied to the blanks preparatory to the thread being rolled thereon. Fig. 16 is a pair of views illustrating a blank centering device hereinafter referred to.

Referring to Fig. 1, the numeral 20 denotes a base supported on standards 21 and having bearings for supporting the main shaft 22 of the machine. This shaft carries a pulley 23 which may be operated by a belt driven from any convenient source, and it also carries at its other end a flywheel 25 whereby the steady running of the shaft is assured. Secured upon the shaft 22 is a pinion 26 in engagement with a gear 27 mounted upon a jack-shaft 28 whereby the several elements of the machine proper are operated. Also secured upon the shaft 28 is a scored pulley 29 which drives by means of a belt 30, a scored pulley 31 mounted upon a shaft 32 extending in the same direction as the shaft 28, and for actuating the mechanism whereby the blanks are to be trimmed, as will hereinafter appear.

Again referring to the jack-shaft 28 it will be seen by referring to Fig. 8 that the same is journaled in bearings 33 secured to the base 20, and that it carries a bevel-gear 34 in engagement with a similar gear 35 which latter is mounted upon a spindle 36 journaled in a bearing 37 on an upright frame 38 which may be secured to the base 20 in any suitable manner. Secured upon the spindle 36 is a cone-pulley 39 which is connected by a belt 40 (see Fig. 1) with the corresponding cone-pulley 41 whereby the blanks in the hopper are agitated in a manner clearly shown in Fig. 12. The cone-pulley 41 is secured upon a shaft 42 having a crank pin 43 which is connected by a push rod 44 with a lever 45 fulcrumed at 46 on the frame 38, while a spring 49 serves to hold the end of the lever 45 in contact with the end of the push rod 43, the organization being such that the rotation of the shaft 42 will move the agitating slide of the hopper outwardly therefrom, and, furthermore, that the inward movement of said slide depends upon the stiffness of the spring 49, so that all injury to the several parts of the mechanism which may result from clogging or choking of the blanks in the hopper, may be avoided.

By referring to Figs. 2 and 12, it will be seen that the fulcrum spindle 46 carries a pair of arms 47 which are connected by means of a bifurcated link 48 with a bracket 49 secured to the agitating slide 50 of the hopper mechanism, said slide being guided in an aperture 51 provided therefor in the hopper, and also in ways 52 secured to the hopper frame. These ways are disposed at opposite sides of the hopper-slide so as to form between them a grooved support 51 having a ledge 52 upon which the heads of the blanks B can rest on their gravitative movement toward the feeding-in mechanism which is illustrated in Figs. 11 and 12.

By referring to Fig. 11, it will be noted that rotatably mounted upon the frame 38 is a disk 53 having peripheral notches, each one of which is adapted to receive a blank which is fed thereinto at $f$ (see Fig. 11) and which rests upon the top surface of the disk in the manner shown in Fig. 12.

Means are provided for intermittently rotating the transfer disk 53 to the devices whereby the thread is rolled onto the blanks subsequently to their being received and held in chucks provided therefor and to be hereinafter described. The transfer disk 53 is loosely mounted upon a stud 54 and has at its underside a fixed ratchet-wheel 55 in engagement with, and adapted to be actuated by, a pawl 56 pivoted on a lever 57 also pivoted on the stud 54, and connected by a link 58 with a cam lever 59 fulcrumed at 60 and carrying at its upper end a lever 61 adapted to be operated by any one of a series of cams 62 (see Fig. 2) mounted for revolution around the axis of a vertically disposed carrier shaft 63. The elements carried by this shaft are clearly shown in Fig. 6 and comprise at the lower end thereof a driving mechanism whereby intermittent movement is imparted thereto, this driving mechanism consisting of a star-wheel 64 rigidly secured to the shaft 63 and having slots 65 (see also Fig. 8) adapted to receive a roller 66 carried on the end of a crank arm 67. This crank arm is secured to a vertical shaft 68 which is journaled in bearings in the frame and has at its upper end a pinion 69 in mesh with a similar pinion 70 which is carried on the upper end of a spindle 71, while at its lower end it carries a bevel gear 72 in permanent engagement with a similar bevel gear 73 (see Fig. 8) secured to the jack shaft 28 above mentioned.

It will, therefore, be seen that a constant rotation of the shaft 28 will result in intermittently rotating the carrier shaft 63, the latter being turned for one-sixth of a rotation for each complete rotation of the jack shaft 28 by virtue of the starwheel construction above described. The means for locking the star-wheel 64 against displacement when the crank arm 67, or more particularly speaking, the roller 66 thereof, is free from the grooves 65, consists in the present instance of the peripheral surface of the hub 74 coming into engagement with properly shaped peripheral recesses or notches 75 of the star-wheel. This mechanism is made use of for the purpose of bringing a series of chucks carried by the carrier into proper position so that the blanks carried thereby can be operated upon in the proper place and at the proper time. Hence, the carrier shaft 63 is provided at its upper end with a spider 76 which is in conjunction with a top plate 77 constituting a chuck carrier, these two elements being properly spaced apart by means of a series of spacer bolts 78 so that they both move together. This chuck-carrier, as it may be termed, carries a series of chucks C of the self-closing type as controlled by springs 79, or in other words, so organized that the chuck jaws may yield to open in order to receive between them the blanks as they are placed or forced thereinto by an injector mechanism or fitting-in device disposed at $i$ (see Figs. 2 and 11). This fitting-in device is clearly shown in Figs. 9 and 10 and transfers the several blanks consecutively from the transfer-wheel 53 into the successively arriving chucks, and it consists of a yielding-forcer 80, the top of which is recessed as at 81, so as to receive the lower end of the blank B. The injector-forcer consists of two parts, namely, the head 80 and also a shank 81 which is secured in a yoke 82 (see Fig. 13), the latter being adapted for vertical movement on the carrier-shaft 63 upon which said yoke is loosely carried and may be shifted longitudinally of the shaft axis, as for instance by a cam 83 in engagement with a cam roller 84 carried by said yoke, said cam being secured upon a shaft 85 in axial parallelism with the carrier-shaft 63. From the above, it will be understood that the carrier-shaft 63 may partly rotate within the hub of the yoke 82 and that the vertical movement of the yoke is entirely controlled by the cam 83, this cam being so timed as to raise the yoke whenever the transfer wheel has arrived at a point of rest and presents a new blank in position to be forced into the chuck then in position to receive it.

Again referring to Fig. 11 attention is called to the fact that the blanks as they are deposited from the hopper-trough into the transfer-wheel 53, they will be retained therein, as for instance by a guard-plate 86 whereby the blanks are prevented from jumping upward, while means are provided for holding the blanks within the notches of the transfer-wheel during its movement from the receiving to the discharge point, this means consisting of a spring actuated retainer 87 (see Fig. 11).

As above stated, the blanks are fed or forced into the chucks at the point $i$ indicated in Figs. 2 and 11, and the chuck-carrier is, in the manner described, intermittently rotated so as to bring the several blanks consecutively into coöperation with, or into position to be operated upon by, the devices whereby the screw thread is to be rolled onto the blanks. This mechanism comprises in the present instance a pair of thread rolling dies 100 and 101 which may be of any desired construction and may be mounted upon shafts 102 and 103, respectively, which are adapted to be adjusted relatively to each other, so as to adapt them for screw blanks of different diameters. The shafts 102 and 103 are journaled in blocks 104, 105, respectively, slidably mounted in ways 106 of the frame and organized so as to move simultaneously either toward or away from each other as controlled by screws 107, 108 which may be similarly rotated by gears 109, 110 in engagement with an intermediate 111 (see Fig. 3).

Secured to the same spindle with the intermediate 111 and for rotating the latter, is a worm gear 112 in engagement with a worm 113 mounted upon a spindle 114. This spindle is journaled in boxes 115 on the frame and has at its outer end a collar 116 provided with an aperture 117 into which a rod may be placed so that the shaft 114 may be turned by hand in order to bring the threading rollers into proper adjusted position relatively to each other. In connection with the mechanism just described, it may be stated that the bearing-blocks 104 and 105 for the threading rollers are comparatively long, so that I preferably employ two sets of gears 109 and 110 at opposite ends of these bearing blocks, so that no clamping action may result.

Inasmuch as the blank carrier has only an intermittently rotative movement, without any rise and fall, so that in other words, the altitude of the several chucks does not in any way change, means have been provided whereby the position of the thread rollers vertically and longitudinally relative to the shank of the blank to be threaded, may be varied so that the screw thread may be rolled onto the blanks at different distances from the heads of the blanks. This mechanism consists in the preferred form thereof shown of a vertical shaft 120 stepped in a bearing 121 on the base and in screw threaded engagement with a lug 122 provided on a vertically movable head 123 in which the ways 106, previously described, are formed, and which, therefore, carries and supports the bearing blocks 104, 105 of the threading rollers. This movable head 123 may be adjusted on ways 124 formed on the frame 138 and when once positioned in proper place, it may be clamped in such position by a binding screw 125 (see Fig. 11). A hand-wheel 126 may be attached to the vertical shaft 120 for manipulating the same by hand.

The means whereby rotatable movement is imparted to both threading rollers simultaneously comprise the main jack shaft 28 above described, and carrying a bevel-gear 127 which is in engagement with a similar gear 128 (see Fig. 3) on a vertical shaft 129 which is journaled in suitable bearings 130, 131 provided therefor in the frame of the machine. The shaft 129 has rigidly secured thereto a pinion 132 which meshes into an intermediate 133 which is mounted on a shaft 134 adapted to be brought into coöperative relation with pinions 135, 136 indicated in dotted lines in Fig. 11, so that both threading rollers will be thrown in the same direction to impinge between the peripheral surfaces thereof the blanks as they are carried along by the several successive chucks. Now, inasmuch as by virtue of the strain exerted upon the blank during the thread rolling operation, there is a tendency that the blank may be thrown out of line, means are provided for steadying the blank during the thread rolling operation, it being understood that the upper end of the blank or head portion thereof is retained in the chuck, while the lower and free end is to be supported. This result is achieved by a bifurcated supporting member 137 shown in Fig. 16, the upper end of which straddles the end of the blank at diametrically opposite points so as to clear the surfaces of the threading rollers so that as a matter of fact the lower end of the blank is confined at two opposite points by the threading rollers and at two points at right angles thereto by the fork-ends of the supporting member 137, it being understood that this supporting member is of such width as to permit the threading rollers to be adjusted so as to come together to operate upon the smallest size screws for which the machine is intended.

The threading rollers may be of any desired construction, and in the present instance, means are preferably provided for maintaining the cutting portions of said rollers clear from scale or chips, these means consisting substantially of scrapers 140, 141 (see Fig. 14) which are pivoted at 142, 143, respectively, and carry at their free ends scrapers 144 and cleaners 145, while they are held in contact with the surface of the threading rollers by springs 146, 147, respectively.

Inasmuch as in the present instance it has been distinctly stated that the screw threads are to be rolled rather than cut onto the screws which action will naturally result in swaging or displacing the metal so as to form ridges and depressions, practice has demonstrated that in order to avoid injury to the blanks as well as to the rollers the blanks should be oiled on their outer surface at such portions of the length thereof as will subsequently be provided with the screw threads.

In Figs. 14 and 15 such an oiling device is illustrated as comprising a lubricant-containing pan 150 having ears 151 whereby said pan may be held on pins 152 secured to the head 123, above mentioned.

Entering into the lubricant contained in the pan 150 is a lubricant-transfer wheel 153 which is mounted on the spindle 154 held in an arm 155 which at its rear end is pivoted as at 156 to a boss 157 on the lubricant pan. The transfer wheel 153 carries the lubricant upward and into contact with the peripheral surface of what may be termed a wiper-wheel 158 which is secured to a quill 159 rotatable on a fixed stud 160 which is also held in the bracket 155 just mentioned and both, the transfer-wheel 153 and the wiper 158 are geared together by pinions 161 and 162 respectively.

By referring to Fig. 14 it should be noted that the path of revolution of the several chucks around the central supporting or carrier shaft 163 is indicated herein by dot-and-dash line 165, and this traveling movement of the chucks is taken advantage of to impart intermittent rotations to the wiper-wheel 158, as for instance by providing on the quill 159 a collar 166 having a series of pins 167 projecting radially from said hub and into the path of the traveling chucks, the organization being such that each chuck as it passes will rotate the wiper-wheel 158 for one-fourth of a rotation, and will consequently deposit oil onto the blank held in the particular traveling chuck.

After the thread has been rolled onto the shank, the latter is during the next intermittent rotation of the carrier shaft 63 brought into position where its lower end is trimmed or chamfered, so as to remove all burs which may exist by virtue of the rolling of the thread at that place. Referring to Fig. 2 this position is indicated at $t$ and the particular construction can be clearly seen in Fig. 6 in which it will be seen that the yoke 82 carries a rack-bar 160 which is in engagement with a pinion 161 carried on a spindle 162 which is journaled in bearings provided therefor in a bracket 163. Also meshing with the pinion 161 but at a point diametrically opposite to the rack 160, is a rod 164 the lower end of which is guided in the bracket 163 just described and also in a bracket 165 secured to the upper end of the movable head 123. Secured to the bracket 165, is a blank-holder 166 whereby the blank is steadied in the chuck while the trimming operation on its lower end progresses, this holder being in axial alinement with the chuck and also with a trimming tool indicated herein by the numeral 167, the upper end of which is recessed in any suitable manner to correspond with the side of the screw to be trimmed and which is guided for vertical movement in the head 123, while its lower end is secured to the vertically movable yoke 82 above described. Therefore, it will be seen that when said yoke is raised by the cam 83 four distinct functions are performed, namely: The injector 81 will bring a blank into the chuck which is in alinement therewith at the time, and the bifurcated blank-retaining rod 137 will be brought into position to straddle and hold the lower end of the blank during the thread rolling operation, and the trimming tool is brought into contact with the lower end of another blank, and furthermore, the rod 164 is pulled down by virtue of the rack 160 and the pinion 161.

The particular purposes of the rod 164 are two-fold, namely: in the first place, to push the head of the blank which is being trimmed downward, so as to bring it into cutting contact with the trimming tool, which object is accomplished by an arm 170 secured to the upper end of the rod, and having in its free and outer end a spring pressed plunger 171 which is adapted to contact with and keep these particular chuck spindles beneath it from rising when the trimming tool is raised to perform its work. The second object of the rod 164 is to eject the completely finished blank from its chuck at a point designated in Fig. 2 by $c$. As before stated each of the chucks is automatic or self closing in action as controlled by springs 79 and the jaws may be opened by rods 172 which project through the upper plate 77 so as to be adapted to come into juxtaposition below an injector arm 173 which is also secured to the rod 164 and so disposed relative to the trimming tool that one-sixth of a rotation on the part of the carrier will bring the trimmed blank into position to be discharged therefrom.

While the several chucks have no rotative movements of their own within the carrier, the trimming tool is rotated to perform its work, and the mechanism doing so comprises the shaft 32 previously referred to and having at its end a beveled gear 174 which is in engagement with a similar gear 175 keyed to the trimming spindle 167.

I claim:—

1. The combination with a blank-carrier, and devices for rolling a thread on the blank, of a trimming tool for operating upon the end of the blank in the carrier, means for moving the carrier to bring the blank from the thread rolling devices to the trimming means, means for moving said tool into coöperation with the blank, and means for holding the blank stationary during the trimming operation.

2. The combination with a blank-carrier, and devices for rolling a thread on the blank, of a trimming tool for operating upon the end of the blank in the carrier, means for moving the carrier to bring the blank from the thread rolling devices to the trimming means, a cam operated device for moving said tool into coöperation with the blank.

3. The combination with a blank-carrier, and devices for rolling a thread on the blank, of a trimming tool for operating upon the end of the blank in the carrier, means for moving the carrier to bring the blank from the thread rolling devices to the trimming means, a device for bringing the tool into coöperation with the blank, means for holding the blank stationary during the trimming operation, and a movable yoke for controlling the actuation of said holding means.

4. The combination with a blank-carrier, means for intermittently rotating the same, of devices for rolling a thread on the blank, means for trimming the end of the blank subsequently to the thread rolling operation, a device for engaging the blank and for holding the same stationary during the trimming operation, a yoke connected with and for operating said device, and a cam for moving said yoke.

5. The combination with a blank-carrier, and thread rolling devices for rolling a thread on the blank, means for rotating said carrier to bring a blank into position between the thread rolling devices, and mechanism for applying lubricant to the blank preparatory to the thread rolling operation.

6. The combination with a blank-carrier, and thread rolling devices for rolling a thread on the blank, means for rotating said carrier to bring a blank into position between the thread rolling devices, and mechanism for applying lubricant to the blank preparatory to the thread rolling operation, and controlled by the movement of the carrier.

7. The combination with a blank-carrier, and thread rolling devices for rolling a thread on the blank, of means for rotating said carrier to bring a blank into position between the thread rolling devices, of mechanism for applying lubricant to the blank preparatory to the thread rolling operation, said mechanism comprising a lubricant tank, and a lubricant transfer device adapted to contact with the blank in the carrier during the movement of the latter.

8. The combination with a blank-carrier, thread rolling devices for rolling a thread on the blank, and means for rotating said carrier to bring a blank into position between the rolling devices, of a lubricant tank, a lubricating wheel exteriorly of said tank and in the path of the traveling blank, and a transfer wheel for carrying lubricant from the tank to said wheel.

9. The combination with a blank-carrier, and thread rolling devices for rolling a thread on the blank, and means for rotating said carrier to bring a blank into position between the thread rolling devices, of a lubricant tank, a transfer wheel extending into said tank, a lubricant wheel contacting therewith and entering the path of the blank in the carrier for applying lubricant to the blank preparatory to the thread rolling operation.

10. The combination with a blank-carrier, thread rolling devices for rolling a thread on the blank, and means for rotating said carrier to bring a blank into position between the rolling devices, of a lubricant tank, a lubricant wheel exteriorly of said tank and in the path of the traveling blank, and a transfer wheel for carrying lubricant from the tank to said wheel, and means for connecting said lubricant and transfer wheels for corotation.

11. The combination with a blank-carrier, thread rolling devices for rolling a thread on the blank, and means for rotating said carrier to bring a blank into position between the rolling devices, of a lubricant tank, a lubricating wheel exteriorly of said tank and in the path of the traveling blank, and a transfer wheel for carrying lubricant from the tank to said wheel, a pair of gears for connecting said lubricant and transfer wheels for corotation.

12. The combination with a blank-carrier, thread rolling devices for rolling a thread on the blank, and means for rotating said carrier to bring a blank into position between the rolling devices, of a lubricant tank, a lubricant wheel exteriorly of said tank and in the path of the traveling blank, and a transfer wheel for carrying lubricant from the tank to said wheel, and means for rotating the lubricating wheel by the movement of the carrier.

13. The combination with a blank-carrier having a chuck, thread rolling devices for rolling a thread on the blank, and means for rotating said carrier to bring a blank into position between the thread rolling devices, of a mechanism for applying lubricant to the blank preparatory to the thread rolling operation, said mechanism comprising a lubricant wheel, and means for applying lubricant thereto, and means carried by said wheel and adapted to be operated by the chuck in the carrier during the movement thereof.

14. The combination with a blank-carrier having a chuck, thread rolling devices for rolling a thread on the blank, and means for rotating said carrier to bring a blank into position between the thread rolling devices, of a mechanism for applying lubricant to the blank preparatory to the thread rolling operation, said mechanism comprising a wheel, and means for applying lubricant thereto, and a star-wheel adapted to be intermittently rotated by said chuck during the movement of the carrier.

15. The combination with a blank-carrier, thread rolling devices for rolling a thread on the blank, and means for rotating said carrier to bring a blank into position between the thread rolling devices, of a lubricant tank, a lubricant wheel adapted to apply lubricant to the blank in the carrier, and means for positioning said wheel to contact with blanks of different sizes in the carrier.

16. The combination with a blank-carrier, and thread rolling devices for rolling a thread on the blank, of means for positioning said devices relatively to each other to accommodate different sizes of blanks, means for driving said devices, and means for intermittently operating the blank-carrier, and a single member for driving said carrier, mechanism and thread rolling devices.

17. The combination with a blank-carrier, of thread rolling devices adapted to roll a thread on the blank in the carrier, and a bifurcated device adapted to straddle the free end of the blank and for steadying the same during the rolling operation.

18. The combination with a blank-carrier, of thread rolling devices adapted to roll a thread on the blank in the carrier, a rod having its end bifurcated, and means for moving said rod to bring said bifurcated end into position to straddle the free end of the blank and for steadying the same during the rolling operation.

19. The combination with a blank-carrier, of thread rolling devices adapted to roll a thread on the blank in the carrier, a rod having its end bifurcated, a movable yoke for actuating said rod to bring said bifurcated end into position to straddle the free end of the blank and for steadying the same during the rolling operation.

20. The combination with a blank-carrier, of thread rolling devices adapted to roll a thread on the blank in the carrier, a rod having its end bifurcated, a movable yoke for actuating said rod to bring said bifurcated end into position to straddle the free end of the blank and for steadying the same during the rolling operation, and a cam actuating said yoke.

21. The combination with a blank-carrier, of thread rolling devices adapted to roll a thread on a blank in the carrier, and means for positioning the thread rolling devices relatively to the carrier to correspond to the amount of thread to be rolled on the blank.

22. The combination with a rotatable blank-carrier, of a pair of coöperative thread rolling devices, a head for supporting said devices, and means for moving said head relatively to the carrier for positioning said rolling devices relatively to the carrier.

23. The combination with a frame, a carrier rotatably mounted therein, and means for actuating said carrier, of a pair of thread rolling devices, a head movable on the frame and for supporting said rolling devices, and an adjusting screw mounted in the frame and in engagement with said head for moving said head to position the thread rolling devices relatively to the carrier.

24. The combination with a hopper, a transfer device adapted to receive successive blanks from the hopper, a blank-carrier comprising a chuck, means for injecting successive blanks from the transfer device into said chuck, devices for rolling a thread on the blank, means for subsequently trimming the end of the blank, means for intermittently moving said transfer device to bring successive blanks from the hopper into alinement with said chuck, and means for discharging the finished blank from the chuck.

25. The combination with a hopper, and means for leading blanks therefrom, of a device for receiving successive blanks from the leading means, means for intermittently moving said device to transfer blanks from said leading means to a point remote therefrom, a blank-carrier, means for injecting blanks successively from said device into the carrier, and rolling devices and trimming devices for operating upon the blank in the carrier.

Signed by me at Springfield, Mass., in presence of two subscribing witnesses.

GEORGE THOMAS WARWICK.

Witnesses:
  G. R. DRISCOLL,
  W. S. BELLOWS.

---

Copies of this patent may be obtained for five cents each, by addressing the "Commissioner of Patents, Washington, D. C."